United States Patent [19]
Stein

[11] 3,846,011
[45] Nov. 5, 1974

[54] CHALKBOARD USABLE AS A REAR PROJECTION SCREEN

[75] Inventor: Edward H. Stein, Wexford, Pa.

[73] Assignee: Hamilton of Indiana, Inc., Vincennes, Ind.

[22] Filed: June 14, 1973

[21] Appl. No.: 370,093

Related U.S. Application Data

[63] Continuation of Ser. Nos. 209,387, Dec. 17, 1971, abandoned, and Ser. No. , , which is a continuation-in-part of Ser. No. 11,295, Feb. 13, 1970, abandoned.

[52] U.S. Cl. .................................. 350/117, 35/62
[51] Int. Cl. ........................................ G03b 21/56
[58] Field of Search ................... 350/117, 126–129; 161/3.5; 35/66, 62

[56] References Cited
UNITED STATES PATENTS

| | | | |
|---|---|---|---|
| 2,528,311 | 10/1950 | Hurley | 35/62 X |
| 3,332,317 | 7/1967 | Peckman et al. | 35/62 X |
| 3,527,519 | 9/1970 | Reitman | 350/117 |

*Primary Examiner*—Richard L. Moses
*Attorney, Agent, or Firm*—Ralph W. Kalish

[57] ABSTRACT

A combination rear projection screen-chalkboard comprising a glass panel having fused to one side thereof a light blue, uniformly textured ceramic enamel frit is disclosed. The texture, color and minimum opacity of the ceramic enamel frit provide for improved writing and image transmittance characteristics.

4 Claims, No Drawings

CHALKBOARD USABLE AS A REAR PROJECTION SCREEN

CROSS REFERENCE TO RELATED APPLICATION

This application is a continuation of application Ser. No. 209,387, filed Dec. 17, 1971, now abandoned which in turn is a continuation-in-part of application Ser. No. 11,295, filed Feb. 13, 1970 now abandoned.

BACKGROUND OF THE INVENTION

Modern photo-viewing techniques have for some years used the rear projection concept. With rear projection equipment, a beam of light in the form of an image is projected from an area behind the viewing screen, and the filmed image is transmitted to the front, textured face of the screen where the image is viewed by those in front.

The currently commercially available rear projection screens are made of flat glass or plastic with one surface textured by sandblasting, acid etching or sprayed-on plastic coating. The projection screens do not possess the writing-erasure characteristics desirable in chalkboards. For writing with chalk, a panel should have an extremely fine "tooth" within its texture to accept a uniformly dense chalk mark or impression, and yet allow the chalk to be removed with a dry eraser without leaving a "ghost mark" of the impression. This balance of characteristics also includes a relatively low reflectance off the surface. None of the commercially available rear projection screens are designed to serve the dual purpose of rear projection screen and chalkboard. Generally, the use of chalk might injure the surface or be difficult to remove.

A ceramic frit-coated and heat-strengthened glass board, a variation of a product sold by PPB Industries, Inc. under the trademark SPANDRELITE, was made for rear projection screen use. This product is off-white in color, is relatively opaque and does not have the transmittance characteristics nor the ability to accept chalk and subsequent erasures as well as the article of this invention.

It is therefore an object of this invention to provide a combination rear projection screen-chalkboard which is made from a glass panel having a finely textured ceramic frit fused to one surface of the glass. The article should be capable of high transmittance of uniformly diffused light to the front viewing surface to thereby provide a very fine resolution of rear-projected images with brilliance, contrast of color tints and tones and integrity of color image. Further, the textured ceramic frit surface should be capable of use as a chalkboard and, in particular, capable of accepting colored chalk for dry erasure and water-soluble crayons or markers for removal with a water-dampened sponge.

SUMMARY OF THE INVENTION

In accordance with this invention, there is provided a combination chalkboard-rear projection screen which comprises a glass panel having a ceramic enamel frit fused to one side of the glass. The ceramic enamel frit is comprised of a glass frit, an abrasive, an opacifier and a colorant. The article of the invention has the combination surface roughness and optical properties, such as gloss, luminous transmittance and reflectance, which provide an exceptionally fine chalkboard surface and a rear projection screen of high fidelity.

DETAILED DESCRIPTION

The combination rear projection screen-chalkboard of this invention comprises a glass substrate, having fused to one surface thereof, a ceramic enamel frit.

GLASS SUBSTRATE

The glass substrate can be a glass panel being in flat sheet form or in curved form. The glass can be chosen from any of the various well-known commercial glasses, for example, soda-lime-silica glass, borosilicate glass, and the like. The nature and composition of various silicate glasses is well known in the art and is described, for example, in the Encyclopedia of Chemical Technology by Kirk Othmer, published by Interscience Encyclopedia, Inc., New York, New York, volume 7, pages 181–188.

A soda-lime-silica glass having the following glass composition is suitable:

| Component | Percent by Weight |
| --- | --- |
| $SiO_2$ | 60 – 75 |
| $Na_2O$ | 10 – 15 |
| $K_2O$ | 0 – 5 |
| $CaO$ | 5 – 15 |
| $MgO$ | 0 – 10 |
| $B_2O_3$ | 0 – 5 |
| $Al_2O_3$ | 0 – 1 |
| $Fe_2O_3$ | 0 – 1 |

The percentages by weight being based on the total weight of the glass composition.

The glass can be made by any of the commercially well-known processes, such as for example, the float process for making float glass, as described in U.S. Pat. No. 3,083,551; the Pittsburgh process, also known as the PENNVERNON process (registered trademark of PPG Industries, Inc.) to make sheet glass, as described in U.S. Pat. Nos. 1,833,379, 1,833,380, 1,833,381 and 1,833,382; and the Continuous Plate process for making plate glass, as typically described in U.S. Pat. Nos. 2,478,090 and 2,505,103.

The glass can be clear or tinted. In fact, a neutral gray-tinted glass sold commercially under the trademark SOLARGRAY and described in U.S. Pat. No. Re. 25,312 is particularly preferred for use in the article of this invention because it provides greater contrast in the resultant article of the invention. The increased contrast provides for sharper resolution of projected images than that achieved by using clear glass. Further, the resulting color accomplished with the ceramic enamel frit fused to the textured surface of the SOLARGRAY glass is an extremely close match to the natural slate used for chalkboards.

The thickness of the glass substrate is not particularly critical but should be about 1/16 to ½ inch in thickness, preferably ⅛, ¼ or ⅜ inch, subject to size and use requirements. If size and weight are a factor, glass of about 1/16 inch in thickness can be used. With glass of this "thinness," tempering is recommended to provide additional strength. Where larger panels are desired, requiring greater strength, thicknesses of about ½ inch should be used.

CERAMIC ENAMEL FRITS

Ceramic enamel frits useful in the practice of this invention are pale blue frits having a melting point of about 800°–1,100° F., preferably about 800°–1,000° F. The term "ceramic enamel frit" or "enamel coating" as used in this invention means the resultant enamel coating which is fused to the surface of the glass substrate. The term "ceramic enamel frit composition" as used in this invention means the ingredients which are mixed together and fused to the glass substrate to become an integral part of the glass substrate.

The ceramic enamel frit compositions used in the practice of this invention include:
1. a glass frit
2. an abrasive
3. an opacifier
4. a coloring agent

GLASS FRIT

The glass frit is a clear particulate glass of relatively low melting point, which is prepared by melting an appropriate glass composition, forming the glass and then rapidly cooling it such that the glass shatters. The glass is then crushed, if necessary, to get a fine particulate glass frit. The prior art has at times referred to both crushed glass particles and the crushed glass particles dispersed in a liquid vehicle as the glass frit. The term "glass frit" will be used in this invention to mean the crushed particulate glass by itself.

The type of glass used in making the glass frit should be a low-melting glass, generally one which melts between 800°–1,100° F., preferably from 800°–1,000° F. It is desirable that the glass frit be low-melting because it is necessary in making the article of the invention to melt and fuse the ceramic enamel frit composition to the glass substrate. If the glass frit melts at too high a temperature, the glass substrate may be thermally deformed during the fusion operation. To meet the low-melting requirements, a lead-borosilicate glass frit composition is preferred in the practice of this invention. Useful glass frit compositions are those which have the following composition:

| Component | Percent by Weight |
| --- | --- |
| PbO | 40 – 80 |
| $B_2O_3$ | 2 – 15 |
| $SiO_2$ | 5 – 50 |
| $Al_2O_3$ | 0 – 3 |
| $Na_2O$ or $K_2O$ | 0 – 5 |
| CaO, MgO | 0 – 5 |

Particularly preferred glass frit compositions are those comprising only lead oxide, boric oxide and silica.

Lead oxide is a flux which reduces the melting temperature of the glass. It is the most popular flux used in low temperature melting glass frits. It may be added to the glass-making ingredients in three forms: litharge (PbO), red lead ($Pb_3O_4$), and white lead ($2PbCO_3 \cdot Pb \cdot OH_2$). Lead oxide may also be introduced to the glass as fritted lead silicate, for example, $PbO \cdot SiO_2$ or $2PbO \cdot SiO_2$.

Silica is the glass former. A high $SiO_2$ content in the glass frit composition increases the hardness of the resultant enamel. Increasing silica content, however, increases the melting temperature of the glass, and, for that reason, care should be taken that not too much is used.

Boric oxide, which may be added to the glass-making ingredients in the form of borax ($Na_2B_4O_7 \cdot 10H_2O$) or boric acid ($B_2O_3 \cdot 3H_2O$), acts as a flux lowering the melting temperature of the glass composition and reducing its viscosity. Boric oxide also provides gloss in the resultant glass enamel.

Alumina, $Al_2O_3$, which may be added to the glass-making ingredients as feldspar, increases the hardness and durability of the resultant ceramic frit enamel. However, $Al_2O_3$ increases the melting temperature of the glass so care should be taken that not too much is used.

Optional fluxes which may be included in the glass composition in small amounts are $Na_2O$ and $K_2O$, which may be added to the glass-making ingredients in the form of soda ash and potassium carbonate, respectively.

A number of other oxides, such as CaO and MgO, may be included in the glass frit composition in small amounts. CaO and MgO serve as fluxes and contribute to the stability, hardness and toughness of the resultant ceramic frit enamel.

The glass frit should constitute about 60 to 70 percent by weight of the ceramic enamel frit composition. The percentage by weight being based on the total weight of the ceramic enamel frit composition. Although slightly lower and higher contents can be tolerated, they are not recommended. The time and temperature of firing, as well as the hardness, durability and appearance of the resultant enamel coating, are all dependent upon the glass frit content. Glass frit content within the specified ranges when combined with the recommended proportions of the other ingredients in the ceramic enamel frit composition give resultant enamel coatings with the highest degree of optical uniformity and surface texture.

ABRASIVE

An abrasive is also present in the ceramic enamel frit composition used in the practice of this invention. The abrasive provides a roughness to the surface which is necessary for chalk writing. Alumina, $Al_2O_3$, is an example of an abrasive useful in the practice of this invention. The alumina content should be approximately 20 to 30 percent by weight of the ceramic enamel frit composition, the percentage by weight being based on the total weight of the composition. Lower abrasive contents, that is, lower than 20 percent by weight, result in an enamel surface which does not have the "tooth" necessary for chalk writing; whereas, higher abrasive contents, that is, higher than 30 percent by weight, make erasure of the chalk difficult.

OPACIFIER

It is also necessary in the practice of this invention to incorporate an opacifier in the ceramic enamel frit composition. $TiO_2$ in an amount ranging from about 4 to 6 percent by weight has been found to be a suitable opacifier. The opacifier diffuses light across the enameled surface. If too much opacifier is used, light transmission through the enamel coating will be reduced to too great a degree, resulting in dull rear-projected images of hazy resolution. If too little opacifier is used, the screen may suffer from being too transparent with too high a light transmittance and the possibility of "hot spots" appearing when high intensity projection lamps are used.

COLORING AGENT

A blue coloring agent must also be included in the ceramic enamel frit composition. 1 to 4 percent by weight cobalt oxide has been found to be suitable in the practice of this invention. When incorporated in proper amounts, the cobalt oxide gives the resultant enameled surface a pale blue tint which serves to provide integrity of color transmittance of rearly projected images, serves to strengthen the color contrast and provides a soft visual appearance through the absorption of some of the transmitted light rays. When too much cobalt oxide is used, the resultant enamel coating is too dark and too much light is absorbed. This results in a dull rear-projected image. When too little cobalt oxide is used, there is insufficient contrast to provide sharp resolution of the rearly projected images.

PROCEDURE FOR PREPARING AND HANDLING THE CERAMIC ENAMEL FRIT COMPOSITION

The ingredients of the ceramic enamel frit composition are mixed together and ground in a ball mill such that the particulated mixture passes through a 325-mesh sieve. In the particulated mixture, there are particles as small as two microns. The ceramic enamel frit composition is then dispersed in a suitable liquid vehicle for eventual spraying and firing onto the glass substrate.

Glass frit vehicles are well known in the art and can be simply water, or can be organic liquids such as methanol, castor oil and turpentine. Alcohol-water mixtures are preferred. A suitable vehicle composition which is useful in the practice of this invention comprises the following:

| | |
|---|---|
| 80 – 95 | percent by weight water |
| 5 – 20 | percent by weight methanol |
| 0 – 2 | percent by weight Aerosol wetting agent |

After the ceramic enamel frit composition has been dispersed in a suitable vehicle, the dispersion is applied to a glass substrate which has been thoroughly cleaned. Washing the glass with hot (130° F.) distilled water has been found to be suitable for cleaning. Application can be by printing, screening or spraying, with spraying being preferred. Spraying provides the most even coating, and by spraying, it is easier to control the thickness of the coating. After the ceramic enamel frit dispersion has been applied, the vehicle is evaporated. Evaporation can be accomplished by air drying at ambient temperature or at a slightly elevated temperature. In any event, the vehicle must be removed without boiling so that the resultant enamel coating is finely textured. After the vehicle has been evaporated, the ceramic enamel frit coating is matured by firing to a temperature of about 1,000°–1,500° F., preferably about 1,100°–1,300° F. Firing can be accomplished by heating in a suitable furnace. The firing fuses the ceramic enamel frit composition to the glass substrate to form the resultant article of the invention.

The thickness of the ceramic enamel frit coating should be between 0.00060 and 0.00085 inch, preferably between 0.00060 and 0.00080 inch. As has been mentioned above, the thickness of the coating can be controlled by regulating the amount and the method in which the dispersed ceramic enamel frit composition is applied to the substrate. Coatings which have a thickness greater than 0.00085 inch have been found to absorb too much light for the resultant article to be useful as a rear projection screen. Coatings of this order of thickness result in dull rearly projected images which are considerably hazy. Coatings which have a thickness of less than 0.00060 inch have too high a light transmittance and could suffer from "hot spots" being visible from intensity projection lamps.

SURFACE ROUGHNESS AND OPTICAL PROPERTIES OF THE ARTICLE OF THE INVENTION

Since the article of the invention is to be used as a chalkboard, it should have a certain surface roughness on the enamel side. The surface roughness, as has been described earlier, is due to the abrasive content of the ceramic enamel frit composition, and also due to the particle size of the frit. Accordingly, it has been found that the abrasive content and particle size should be chosen within the above-mentioned specified ranges such that the surface roughness on the enamel side as indicated on a "Talysurf" Model No. 3 surface measuring instrument is of the order of 75-95 micro-inches as a Center Line Average (C.L.A.) Index. A surface of this roughness is required to provide the "tooth" necessary for chalk writing and for the required diffusing of the transmitted image. The C.L.A. Index for a particular surface is the average of the various average distances from the center line to the peaks and valleys of the surface for each standardized length of surface measured. A pick-up unit having a sharply pointed stylus with a ruby point 125 microns in diameter is traversed across the surface, generally for about ¼ inch, and all irregularities coming within the standardized length of surface are recorded as a C.L.A. Index which is not a measure of the distance between peeks and valleys, but is a measure of the average distance from peaks and valleys to a center line between peaks and valleys. Each standardized length yields an average, and the average of these averages is the C.L.A. Index.

OPTICAL PROPERTIES

To be useful as a rear projection screen, it is necessary that the article of this invention have optical properties which are within certain specified ranges. The optical properties of the resultant article of the invention are determined principally by the thickness and tint of the glass, the thickness, surface smoothness and composition of the ceramic enamel frit coating. Particularly in the enamel coating, the content of the opacifier and the coloring, as well as the composition of the glass frit, the particle size of the ceramic enamel frit composition will determine the resultant optical properties of the article of this invention.

Accordingly, these immediately recited variables should be regulated with respect to one another to achieve desired optical properties.

In order that the article of the invention be usable as a rear projection screen for wide angle viewing, gloss should be kept at a minimum. For an incident viewing angle of 60°, the gloss, as measured on the enameled side, per A.S.T.M. D–523–53T ranges from 3 to 14 units. A matte as opposed to a brilliant finish is also necessary to avoid specular reflection of extraneous light from a lighted room or from daylight.

For overall screen viewing, a high light transmission (as measured by the light source striking the enamel-free surface) and a low reflection (as measured by the light reflecting from the enameled surface) are desirable. The total luminous transmittance for Illuminant "C" of the article of this invention using an approximately ¼ inch clear plate glass sheet coated with 0.00075 inch of a ceramic frit enamel should be at least 39 percent, and preferably from 45 to 55 percent, and the total luminous reflectance should range from 10 to 20 percent.

Color integrity and contrast of the transmitted image is particularly due to the pale blue color of the enameled surface. In terms of Illuminant "C," the transmitted dominant wavelength of the article of this invention is between 485–495 millimicrons, preferably around 493 millimicrons, and the reflected dominant wavelength is between 475–485 millimicrons, preferably around 483 millimicrons. Excitation purity is a measure of paleness and should be as low as possible. For Illuminant "C," excitation purity in transmittance should be below 8 percent, and preferably about 1.8 to 2 percent. In reflectance the excitation purity should be below 13 percent, and preferably between 4.7 and 5.1 percent.

The luminous transmittance referred to above is the summation of the percentage of the incident, visible radiant energy (weighted by the energy distribution of the source and the eye's sensitivity) that will pass through the glass as described. In the present invention, the source, unless otherwise stated, is Illuminant "C," a standard source adopted by the International Commission on Illumination.

The specifications referred to above for determining color, such as the dominant wavelength and excitation purity, have been derived from tristimulus values that have been adopted by the International Commission on Illumination as a direct result of experiments involving many observers. These specifications can be determined by calculating the trichromatic coefficients, $x$, $y$ and $z$, from the tristimulus values. The trichromatic coefficients, $x$ and $y$, are plotted on a chromaticity diagram and compared with the coordinates of Illuminant "C" as a standard light source. This comparison provides the information to determine the excitation purity and dominant wavelength. An understanding of these terms and definitions thereof may be had by referring to the Handbook of Colorimetry, prepared by the staff of the Color Measurement Laboratory, Massachusetts Institute of Technology, under the direction of Arthur C. Hardy. This book was printed in 1936 by the Technology Press, Massachusetts Institute of Technology, Cambridge, Massachusetts.

The spectral transmittance and reflectance measurements of the articles of the present invention, referred to above, were made by standard spectrophotometric methods. A Beckman Quartz Spectrophotometer Model DK–2A was used.

Transmittance measurements were made by directing the light at the enamel-free surface such that the ray of light passed through the thickness of the glass and then through the enamel coating. Reflectance measurements were made by reflecting the light from the enameled surface.

EXAMPLES

Example I

A ceramic enamel frit having the following composition:

| Ingredient | Percent by Weight |
| --- | --- |
| Lead-Borosilicate Glass Frit | 68 |
| Aluminum Oxide | 22 |
| Titanium Dioxide | 6 |
| Cobalt Oxide | 4 |

(the percentages by weight being based on the total weight of the ceramic enamel frit composition) is prepared by batch mixing the ingredients, grinding them in a ball mill and passing the resultant particles through a 325-mesh sieve. The particulated ceramic enamel frit composition is then dispersed in a vehicle comprising 90 percent by weight water and 10 percent by weight alcohol to form a 70 percent by weight solids dispersion.

The dispersion is contained in a pressure tank and then sprayed onto the plate glass surface. The enamel-coated plate glass is then placed in a roller furnace, where the temperature is gradually increased to 1,200° F. as the plate moves through the furnace. The finished article has a pale blue enamel coating of approximately 0.00075 inch. The article has an extremely fine textured matte surface of uniform consistency. When employed as a rear projection screen, the article has a high degree of optical uniformity and performance. The article gives a high transmittance of uniformly diffused light to the front surface providing a fine resolution of the rear-projected image. Further, the surface readily accepts chalk and water-soluble crayon which could easily be removed by dry erasure and water-dampened sponge. The surface roughness and optical properties of this particular article are presented in Table I below.

Example II

A sample of an off-white ceramic enamel frit-coated product sold by PPG Industries, Inc. for rear projection screen use under the trademark SPANDRELITE was prepared for the purpose of comparison with the article of the invention as prepared according to Example I. The procedure of Example I was generally followed with the following exceptions:

The ceramic enamel frit composition had approximately the following composition:

| Ingredient | Percent by Weight |
| --- | --- |
| Lead-Borosilicate Glass Frit | 60 – 70 |
| Aluminum Oxide | 20 – 30 |
| Titanium Dioxide | 10 – 20 |

The ceramic enamel frit composition, after being dispersed in a water-methanol vehicle as described in Example I, was then sprayed onto a clear plate glass sheet. The finished article, after firing, had a coating of about 0.00015 inch. The surface roughness and optical properties of the resultant coated article are presented in Table I below.

Table I

Surface Roughness and Optical Properties of Ceramic Enamel Frit-Coated Glass Panels

| Property | Sample | |
|---|---|---|
| | Example I | Example II |
| Enamel Roughness (Talysurf C.L.A. Index) | 83 | 60 |
| 60° Gloss (A.S.T.M. D-523-53T) | 13 | 7.8 |
| Total Luminous Transmittance | 50.6% | 28.2% |
| Total Luminous Reflectance | 14.0% | 40.7% |
| Dominant Wavelength | | |
| Transmittance | 493 | 571.4 |
| Reflectance | 483 | 479.6 |
| Excitation Purity | | |
| Transmittance | 1.9% | 8.6% |
| Reflectance | 4.9% | 6.0% |

The source of light was Illuminant "C".

Thus, the invention provides an article which can be used both as a chalkboard and a rear projection screen. The article is capable of high transmittance of uniformly diffused light to the front surface to thereby provide a very fine resolution of rear-projected images with brilliance, contrast of color tints and tones, and integrity of color images. The article has a uniformly coated, microscopically fine abrasive surface having a high degree of optical uniformity to permit the surface to be used as a rear projection screen glass for use in various equipment or devices for the projection of images, including television screens and overhead projectors. The textured surface of the article permits the projected image to be viewed at the extreme angles of incidence to the screen such as 60° or greater.

Further, the article has brightness and color contrast of a magnitude to permit viewing the projected image under relatively high conditions of artificial or natural lighting in the area of the viewer. When a tinted glass is used in lieu of clear glass for such applications, a greater amount of contrast is obtained. Also, the textured ceramic enamel frit surface is capable of use as a chalkboard and, in particular, is capable of accepting colored chalk for dry erasure and water-soluble colored crayons and markers, with these markings removable by a water-dampened sponge or similar cleaning.

I claim:

1. A combination chalkboard-rear projection screen comprising:
   a. a glass panel having a ceramic enamel frit coating fused to one side thereof, said coating having a thickness in the range of 0.00060 to 0.00085 inches; said combination chalkboard-rear projection screen having the following surface roughness and optional properties:
      1. a surface roughness of 75 to 95 micro-inches as a center line average index,
      2. a gloss as determined by A.S.T.M. D-523-53T of from 3 to 14 units,
      3. a total luminous transmittance of at least 39 percent, and
      4. a total luminous reflectance of below 20 percent.

2. The article of claim 1 wherein the combination chalkboardrear projection screen has a dominant wavelength of about 485 to 495 millimicrons and an excitation purity of about 2 percent.

3. The article of claim 1 wherein the total luminous transmittance is at least 50 percent.

4. The article of claim 3 wherein the total luminous reflectance is below about 15 percent.

* * * * *